(12) United States Patent
Xiao et al.

(10) Patent No.: US 11,134,400 B2
(45) Date of Patent: Sep. 28, 2021

(54) USER EQUIPMENT, BASE STATION, AND RELATED METHODS

(71) Applicants: SHARP KABUSHIKI KAISHA, Sakai (JP); FG INNOVATION COMPANY LIMITED, Tuen Mun (HK)

(72) Inventors: Fangying Xiao, Shanghai (CN); Renmao Liu, Shanghai (CN)

(73) Assignees: SHARP KABUSHIKI KAISHA, Osaka (JP); FG INNOVATION COMPANY LIMITED, Tuen Mun (HK)

(*) Notice: Subject to any disclaimer, the term of this patent is extended or adjusted under 35 U.S.C. 154(b) by 0 days.

(21) Appl. No.: 16/637,693

(22) PCT Filed: Aug. 8, 2018

(86) PCT No.: PCT/CN2018/099379
§ 371 (c)(1),
(2) Date: Feb. 7, 2020

(87) PCT Pub. No.: WO2019/029565
PCT Pub. Date: Feb. 14, 2019

(65) Prior Publication Data
US 2020/0169899 A1 May 28, 2020

(30) Foreign Application Priority Data
Aug. 10, 2017 (CN) .......................... 201710683129.0

(51) Int. Cl.
*H04L 12/24* (2006.01)
*H04W 76/27* (2018.01)
(Continued)

(52) U.S. Cl.
CPC .......... *H04W 24/02* (2013.01); *H04W 76/18* (2018.02); *H04W 76/27* (2018.02); *H04W 84/20* (2013.01)

(58) Field of Classification Search
None
See application file for complete search history.

(56) References Cited

U.S. PATENT DOCUMENTS

2016/0192249 A1 6/2016 Wu
2016/0212753 A1 7/2016 Wu
(Continued)

FOREIGN PATENT DOCUMENTS

CN 105684496 A 6/2016
WO WO 2016/064334 A1 4/2016

OTHER PUBLICATIONS

Nokia, Alcatel-Lucent Shanghai Bell: "Further considerations for SCG SRB and RLF handling", R2-1706857, 3GPP TSG-RAN WG2 NR Adhoc #2, Qingdao, China, Jun. 27-29, 2017.
(Continued)

*Primary Examiner* — Gary Lafontant
(74) *Attorney, Agent, or Firm* — Finnegan, Henderson, Farabow, Garrett & Dunner LLP (57) ABSTRACT

The present disclosure provides a method used in User Equipment (UE). The UE is configured with a Master Cell Group (MCG) duplicated Signaling Radio Bearer (SRB). The MCG duplicated SRB is associated with an MCG and a Secondary Cell Group (SCG) and configured to be used for uplink transmission via the SCG. The method comprises: detecting an SCG failure; and reconfiguring the MCG duplicated SRB to be used for uplink transmission via the MCG, or triggering an MCG failure.

8 Claims, 6 Drawing Sheets

(51) Int. Cl.
*H04W 76/15* (2018.01)
*H04W 28/02* (2009.01)
*H04W 24/02* (2009.01)
*H04W 76/18* (2018.01)
*H04W 84/20* (2009.01)

(56) References Cited

U.S. PATENT DOCUMENTS

2016/0302256 A1    10/2016  Susitaival
2019/0208474 A1*   7/2019   Ali ........................ H04W 84/20

OTHER PUBLICATIONS

NTT Docomo: "New SID Proposal: Study on New Radio Access Technology", RP-160671, 3GPP TSG RAN Meeting #71, Göteborg, Sweden, 7.-10. Mar. 2016.

International Search Report and Written Opinion issued in related International Application No. PCT/CN2018/099379, dated Oct. 29, 2018 (6 pgs.).

The extended European search report pursuant to Rule 62 EPC, the supplementary European search report (Art. 153(7) EPC) and the European search opinion issued in related EP Application No. 18844831.0, dated Apr. 1, 2021 (8 pgs.).

ZTE, "Configuration of SCG SRB and Split&Duplicated SRB," 3GPP TSG-RAN WG3#Ad-hoc R3-172053, Jun. 26-29, 2017 (7 pgs.).

* cited by examiner

USER EQUIPMENT, BASE STATION, AND RELATED METHODS

TECHNICAL FIELD

The present disclosure relates to the field of wireless communications technologies. More specifically, the present disclosure relates to user equipment, a base station, and a method related to an SCG failure.

BACKGROUND

A new research project on 5G technical standards (see non-patent literature: RP-160671: New SID Proposal: Study on New Radio Access Technology) was proposed by NTT DOCOMO at the 3rd Generation Partnership Project (3GPP) RAN #71 plenary meeting held in March 2016, and was approved. The goal of the research project is to develop a New Radio (NR) access technology to meet all of the application scenarios, requirements, and deployment environments of 5G. NR mainly has three application scenarios: Enhanced Mobile Broadband Communications (eMBB), massive Machine Type Communications (mMTC), and Ultra Reliable and Low Latency Communications (URLLC).

In the 3GPP RAN2 #96 meeting held in October 2016, it was agreed that research will be carried out on multi-connectivity (including dual-connectivity) so as to meet the URLLC reliability requirement. The multi-connectivity may adopt a mechanism such as packet duplication or link selection. In the 3GPP NR AdHoc meeting held in January 2017, it was agreed that an NR-PDCP entity supports a packet duplication function of a user plane and a data plane, wherein the function of a transmitting PDCP entity is to support packet duplication, while the function of a receiving PDCP entity is to support duplicate discarding. In the 3GPP NR AdHoc meeting held in June 2017, it was agreed that in a dual-connectivity scenario, a master base station decides whether to use a Master Cell Group (MCG) duplicated Signaling Radio Bearer (SRB) and configure the MCG duplicated SRB via Radio Resource Control (RRC) signaling of the master base station. In addition, in this meeting it was also agreed that in a dual-connectivity scenario, for the MCG duplicated SRB, whether uplink transmission is performed by adopting an MCG, a Secondary Cell Group (SCG), or both the MCG and the SCG in a duplicate transmission mode is configured via RRC signaling.

In light of the aforementioned points, it is desirable to solve problems related to occurrence of an SCG failure when RRC signaling configures, for an MCG duplicated SRB, uplink transmission to adopt an SCG in a dual-connectivity scenario supporting packet duplication.

SUMMARY

According to a first aspect of the present disclosure, a method used in User Equipment (UE) is provided, the UE being configured with a Master Cell Group (MCG) duplicated Signaling Radio Bearer (SRB), the MCG duplicated SRB being associated with an MCG and a Secondary Cell Group (SCG) and configured to be used for uplink transmission via the SCG, and the method comprising: detecting an SCG failure; and reconfiguring the MCG duplicated SRB to be used for uplink transmission via the MCG, or triggering an MCG failure.

In an embodiment, the UE is further configured with another MCG duplicated SRB, and the method further comprises, after the SCG failure is detected: reconfiguring the other MCG duplicated SRB to be used for uplink transmission via the MCG.

In an embodiment, the method further comprises: reporting the SCG failure to a base station, wherein the reporting the SCG failure to a base station comprises: transmitting the SCG failure information to the base station via the MCG by using the reconfigured MCG duplicated SRB, or transmitting the SCG failure information to the base station through a Common Control Channel (CCCH) by using the MCG SRB.

In an embodiment, the method further comprises: receiving from the base station instruction information instructing the UE whether to perform uplink transmission via the MCG when the SCG fails, wherein the reconfiguration is performed only when the instruction information instructs to perform uplink transmission via the MCG when the SCG fails.

According to a second aspect of the present invention, User Equipment (UE) is provided, comprising a transceiver, a processor, and a memory, the processor storing instructions executable by the processor to cause the UE to perform the method according to the above first aspect.

According to a third aspect of the present disclosure, a method used in a base station is provided, the base station being a Master Cell Group (MCG) base station and communicating with User Equipment (UE) over an MCG duplicated Signaling Radio Bearer (SRB), the MCG duplicated SRB being associated with the MCG and a Secondary Cell Group (SCG) and configured to be used for uplink transmission via the SCG, and the method comprising: receiving from the UE a report on an SCG failure; and reconfiguring the MCG duplicated SRB to receive uplink transmission via the MCG.

In an embodiment, the receiving a report on an SCG failure comprises: receiving the SCG failure information via the MCG by using the reconfigured MCG duplicated SRB, or receiving the SCG failure information through a Common Control Channel (CCCH) by using the MCG SRB.

In an embodiment, the base station further communicates with the UE over another MCG duplicated SRB, and the method further comprises: reconfiguring the other MCG duplicated SRB to receive uplink transmission via the MCG.

In an embodiment, the method further comprises: transmitting to the UE instruction information instructing the UE whether to perform uplink transmission via the MCG when the SCG fails.

According to a fourth aspect of the present disclosure, a base station is provided, comprising a transceiver, a processor, and a memory, the processor storing instructions executable by the processor to cause the base station to perform the method according to the above third aspect.

DESCRIPTION OF THE DRAWINGS

The above and other features of the present disclosure will become more apparent with the following detailed description in conjunction with the accompanying drawings.

DETAILED DESCRIPTION

The following describes the present disclosure in detail with reference to the accompanying drawings and specific embodiments. It should be noted that the present disclosure should not be limited to the specific embodiments described below. In addition, for simplicity, detailed description of the known art not directly related to the present disclosure is omitted to prevent confusion in understanding the present disclosure.

Some terms involved in the present disclosure are described below. If not specifically indicated, the terms involved in the present disclosure use the definitions herein. The terms given in the present disclosure may be named differently in NR, LTE, and eLTE, but unified terms are used in the present disclosure. When applied to a specific system, the terms may be replaced with terms used in the corresponding system.

RRC: Radio Resource Control

PDCP: Packet Data Convergence Protocol. In the present disclosure, if not specifically indicated, the PDCP may represent a PDCP in NR or LTE or eLTE.

RLC: Radio Link Control. In the present disclosure, if not specifically indicated, the RLC may represent RLC in NR or LTE or eLTE. A transmission mode of an RLC entity may be configured as one of the following: a Transparent Mode (TM), an Unacknowledged Mode (UM), or an Acknowledged Mode (AM).

MAC: Medium Access Control. In the present disclosure, if not specifically indicated, the MAC may represent a MAC entity in NR or LTE or eLTE.

CCCH: Common Control Channel.

PDU: Protocol Data Unit.

SDU: Service Data Unit.

In the present disclosure, data received from or transmitted to an upper layer is referred to as an SDU; data transmitted to or received from a lower layer is referred to as a PDU. For example, data received from or transmitted to an upper layer by a PDCP entity is referred to as a PDCP SDU, and data received from or transmitted to an RLC entity by the PDCP entity is referred to as a PDCP PDU (i.e., an RLC SDU).

Master Base Station: Master eNB or Master gNB, denoted as MeNB (a base station corresponding to E-UTRAN or LTE or eLTE) or MgNB (a base station corresponding to 5G-RAN or NR). The master base station is an eNB that at least terminates at a control node mobility management entity (which can be denoted as S1-MME) for processing interaction between UE and a core network in dual-connectivity: or a gNB that at least terminates at an NG-C, wherein the NG-C is a control plane interface between an NG-RAN an a 5GC.

Secondary Base Station: Secondary eNB or Secondary gNB, denoted as SeNB (a base station corresponding to E-UTRAN or LTE or eLTE) or SgNB (a base station corresponding to 5G-RAN or NR). The secondary base station is a base station that does not serve as a master base station, but provides additional radio resources for UE in dual-connectivity.

Primary Cell: Primary Cell (PCell). The PCell is a cell that operates on a primary frequency, and may be a cell on which UE performs an initial connection establishment procedure or initiates a connection re-establishment procedure or which is designated as a primary cell during a handover procedure. The cell in the present disclosure may also be referred to as a carrier or a set of beams.

Primary Secondary Cell: Primary Secondary Cell (PS-Cell). The PSCell is an SCG cell used to instruct UE to perform random access during an SCG switching procedure.

Secondary Cell: Secondary Cell (SCell). The SCell is a cell that operates on a secondary frequency. The cell can be configured after an RRC connection is established and can be used to provide additional radio resources.

Cell Group: Cell Group, CG. The CG is a group of serving cells or carriers associated with a master base station or a secondary base station in dual-connectivity or multi-connectivity.

Master Cell Group: Master Cell Group (MCG). For UE not configured with multi-connectivity, the MCG consists of all serving cells; for UE configured with multi-connectivity, the MCG consists of a subset of serving cells (i.e., a group of serving cells associated with a master base station) comprising a PCell and 0, 1, or a plurality of SCells.

Secondary Cell Group: Secondary Cell Group (SCG). The SCG is a group of serving cells associated with an SeNB or an SgNB in dual-connectivity. The SCG may comprise one PSCell, and may further comprise one or a plurality of SCells.

Dual-Connectivity: In NR, UE in an RRC connected state is configured to utilize resources provided by two different schedulers respectively located in base stations connected by a non-ideal backhaul. In LTE/LTE-A/eLTE, UE in an RRC connected state is configured with one MCG and one SCG; in other words, UE with two receivers and/or transmitters in a connected state is configured to use two EUTRAN radio resources provided by two different schedulers that may be connected by a non-ideal backhaul. A dual-connectivity data transmission mode comprises, but is not limited to, data duplication and link selection. The link selection transmission mode refers to that the same data or PDCP PDU or PDCP SDU is transmitted in one cell group in two cell groups or radio resources provided by the two cell groups configured for the UE.

DRB: Data Radio Bearer carrying user plane data, also referred to as data bearer for short.

Split DRB: A DRB of which a wireless protocol is located at a master base station and a secondary base station and which simultaneously utilizes resources provided by the master base station and the secondary base station in LTE/LTE-A/eLTE in dual-connectivity. If a PDCP entity of the split DRB is located in a master base station (namely, data arrives at the master base station first and is forwarded by the master base station to a secondary base station to split the data in the master base station), then the split DRB is referred to as an MCG split DRB; if a PDCP entity of the split DRB is located in a secondary base station (namely, data arrives at the secondary base station first and is forwarded by the secondary base station to a master base station to split the data in the secondary base station), then the split DRB is referred to as an SCG split DRB. If not specifically indicated, the split DRB in the present disclosure may be an MCG split DRB or an SCG split DRB. The embodiments of the present disclosure are also applicable to scenarios where the MCG split DRB and the SCG split DRB are not distinguished.

SRB: Signaling Radio Bearer. The bearer may be used for transmitting an RRC message and a NAS message or for transmitting only an RRC message and a NAS message. The SRB may comprise SRB0, SRB1, SRB1bis, and SRB2.

SRB0 is used for an RRC message using a CCCH logical channel; SRB1 is used for an RRC message using a DCCH logical channel, wherein the RRC message may comprise a NAS message, and SRB1 is also used for transmitting a NAS message before SRB2 is established. SRB1bis is used for an RRC message and a NAS message using a DCCH logical channel prior to secure activation, where the RRC message may include a NAS message. SRB2 is used for an RRC message and a NAS message using a DCCH logical channel, where the RRC message comprises recorded measurement information (or referred to as a measurement log). An SRB can be either an MCG SRB or an SCG SRB. The bearer in the present disclosure may be an SRB or a DRB.

Split SRB: An SRB of which a wireless protocol is located at a master base station and a secondary base station and which simultaneously utilizes resources provided by the master base station and the secondary base station in LTE/LTE-A/eLTE in dual-connectivity. If a PDCP entity and/or RRC of the split SRB is located in a master base station (namely, signaling, also referred to as data, is forwarded by the master base station to a secondary base station to split the signaling in the master base station), then the split SRB is referred to as an MCG split SRB; if a PDCP entity and/or RRC of the split SRB is located in a secondary base station (namely, signaling, also referred to as data, is forwarded by the secondary base station to a master base station to split the signaling in the secondary base station), then the split SRB is referred to as an SCG split SRB.

In dual-connectivity, if a wireless protocol of a bearer is split in a master base station and belongs to an MCG and an SCG, then the bearer is referred to as an SCG split bearer. The SCG split bearer may be an MCG split DRB or an MCG split SRB.

In dual-connectivity, in NR, if a wireless protocol of a bearer is split in a secondary base station and belongs to an MCG and an SCG, the bearer is referred to as an SCG split bearer. The SCG split bearer may be an SCG split DRB or an SCG split SRB.

If not specifically indicated, the split SRB in the present disclosure may be an MCG split SRB or an SCG split SRB. The embodiments of the present disclosure are also applicable to scenarios in which the MCG split SRB and the SCG split SRB are not distinguished. The split SRB may be configured to be used for transmission in a packet duplication or link selection mode.

In the present disclosure, the split bearer may comprise: an MCG split DRB, an MCG split SRB, an SCG split DRB, and an SCG split SRB.

Packet Duplication: Also referred to as duplication or data duplication. Both an SRB and a DRB may be configured with packet duplication. When a radio bearer (including an SRB and a DRB) is configured with packet duplication, a secondary RLC entity and a secondary logical channel are added for the radio bearer to process duplicate PDCP PDUs. PDCP packet duplication refers to that the same PDCP PDU is transmitted twice or a plurality of times, once in an original RLC entity, and once in a secondary RLC entity. The PDCP PDU transmitted twice is not transmitted on the same carrier. In a dual-connectivity mode, two logical channels of the radio bearer configured with packet duplication belong to different MAC entities.

Packet Duplication Split Bearer: A split bearer configured with packet duplication in a dual-connectivity mode. In the transmission mode, the same data is transmitted over two wireless protocols of a split bearer, which may comprise an MCG packet duplication split SRB, an SCG packet duplication split SRB, an MCG packet duplication split DRB, and an SCG packet duplication split DRB. If the packet duplication split bearer is an MCG packet duplication split bearer, then a PDCP entity located in a master base station or an MCG is responsible for packet duplication and/or packet discarding; if the packet duplication split bearer is an SCG packet duplication split bearer, then a PDCP entity located in a secondary base station or an SCG is responsible for packet duplication and/or packet de-duplication.

Figure 1:
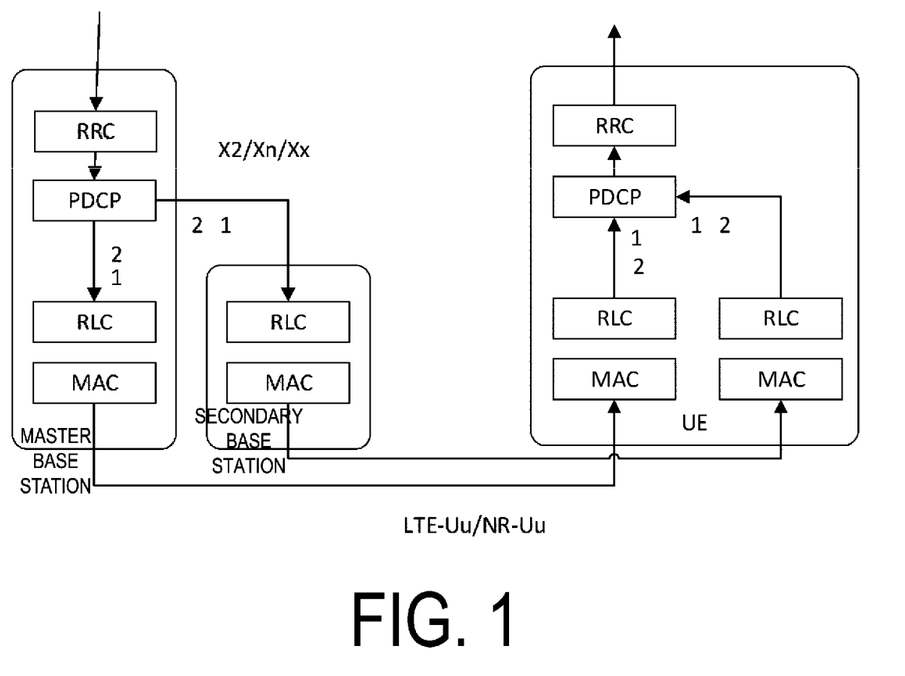
FIG. 1 is a schematic diagram illustrating data transmission over an MCG duplicated SRB.

FIG. 1 is a schematic diagram illustrating downlink transmission of an MCG packet duplication split SRB between a base station and User Equipment (UE) in dual-connectivity. It should be understood that uplink transmission of the MCG packet duplication split SRB between the base station and the UE can adopt the same protocol architecture, except that data is transmitted from the UE to the base station, that is, the arrows in FIG. 1 are reversed. As shown in FIG. 1, data (for example, a PDCP PDU) is transmitted over two wireless protocols (corresponding to two RLC entities associated with the same PDCP entity) of the split SRB by using resources of a master base station and a secondary base station. In the dual-connectivity mode, corresponding to the split SRB configured with packet duplication, each PDCP PDU is transmitted to a receiving party via two RLC entities. An interface between the master base station and the secondary base station may be denoted as Xn or Xx or X2. The interface may be named differently according to different types of the MeNB and the SeNB. For example, the interface is denoted as Xx if the MeNB is an LTE eNB and the SeNB is a gNB; or the interface is denoted as Xn if the MeNB is a gNB and the SeNB is an eLTE eNB.

Figure 2:
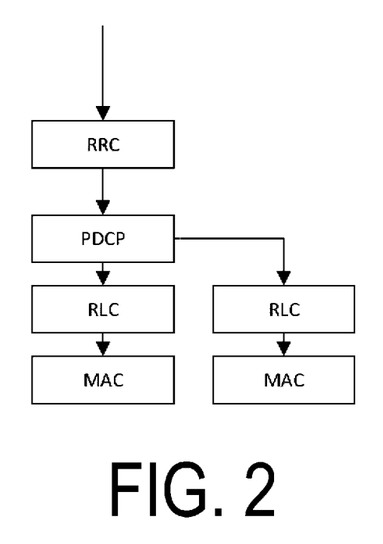
FIG. 2 is a schematic diagram of a protocol architecture in User Equipment (UE)

FIG. 2 is a schematic diagram of a protocol architecture in User Equipment (UE) in a dual-connectivity scenario. In the schematic diagram shown in FIG. 2, an RRC entity and a PDCP entity of one split SRB are associated with two RLC entities, two logical channels, and two MAC entities.

Some embodiments of the present disclosure use transmitting a packet or a PDCP PDU twice (that is, one PDCP PDU is transmitted on two RLC entities and/or two logical channels associated therewith) as an example. However, the technical solution in the present disclosure is not limited to the scenario of transmitting a PDCP PDU twice, and those skilled in the art could easily expand the technical solution to scenarios of transmitting a DCP PDU a plurality of times (that is, one PDCP entity is associated with a plurality of RLC entities and/or a plurality of logical channels).

In the embodiments of the present disclosure, an MCG split SRB configured with packet duplication is referred to as an MCG duplicated SRB; an SRB using only resources of a master base station or an MCG, or an SRB of which a wireless protocol is located only in a master base station or an MCG is referred to as an MCG SRB.

In the embodiments of the present disclosure, SRB0 may be configured as MCG SRB0, that is, a wireless protocol of SRB0 is located in an MCG, and radio resources provided by the MCG are used for transmission (including uplink transmission and downlink transmission); SRB1 may be configured as MCG SRB1 or MCG duplicated SRB1; SRB2 may be configured as MCG SRB2 or MCG duplicated SRB2. The downlink transmission of MCG duplicated SRB1 or SRB2 adopts a packet duplication mode, and the uplink transmission is configured via RRC signaling to adopt an MCG or an SCG, or an MCG and an SCG.

In the embodiments of the present disclosure, an RLC entity and a MAC entity belonging to, or located in, or corresponding to an MCG are denoted as MCG-RLC and MCG-MAC; an RLC entity and a MAC entity belonging to or located in or corresponding to an SCG are denoted as SCG-RLC and SCG-MAC.

Figure 3:
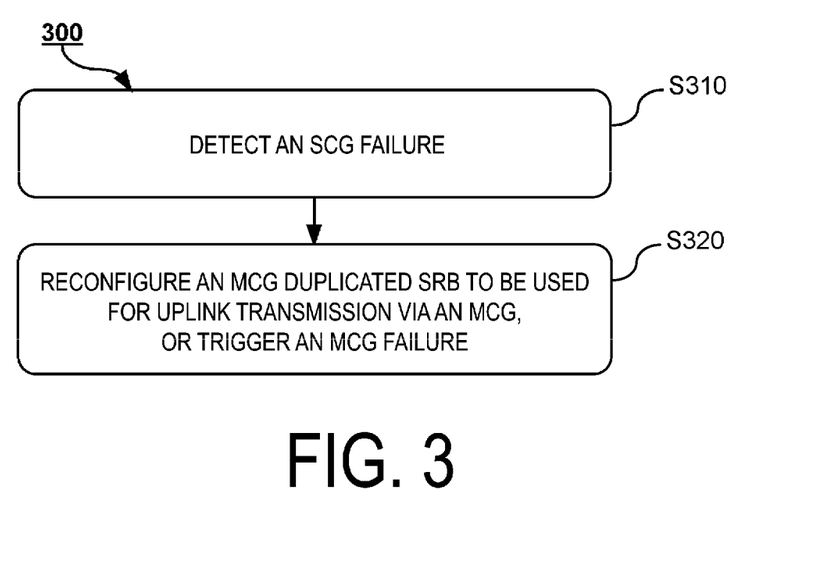
FIG. 3 is a flowchart of a method used in user equipment according to an embodiment of the present disclosure.

FIG. 3 is a flowchart of a method 300 used in user equipment according to an embodiment of the present disclosure. The UE is configured with a Master Cell Group (MCG) duplicated Signaling Radio Bearer (SRB) (e.g., SRB1), and the MCG duplicated SRB is associated with an MCG and a Secondary Cell Group (SCG) and configured to be used for uplink transmission via the SCG.

Herein, the UE may receive Radio Resource Control (RRC) signaling (also referred to as an RRC message) from a master base station. The RRC signaling is used to configure or reconfigure MCG duplicated SRB1 for the UE or reconfigure MCG SRB1 as MCG duplicated SRB1. The RRC signaling may be an RRC connection reconfiguration message RRCConnectionReconfiguration.

In an example, the RRC signaling for configuring MCG duplicated SRB1 carries an indicator for indicating an uplink transmission path, or an uplink transmission mode, or an uplink transmission configuration of MCG duplicated SRB1; uplink transmission of MCG duplicated SRB1 may adopt an MCG (i.e., using radio resources provided by the MCG, or a PDCP entity transmits a PDCP PDU to MCG-RLC), an SCG (i.e., using radio resources provided by the SCG, or the PDCP entity transmits a PDCP PDU to SCG-RLC), or the MCG and the SCG (i.e., in a packet duplication mode by using the radio resources provided by the MCG and the SCG, or the PDCP entity transmits the same PDCP PDU to the MCG-RLC and the SCG-RLC). The value of the indicator may be MCG, SCG, both, or duplicate. When the value of the indicator is MCG, it indicates that the uplink transmission of MCG duplicated SRB1 adopts the MCG, that is, the PDCP entity transmits data of SRB1 or a PDCP PDU to the MCG-RLC and/or MCG-MAC by using the radio resources of the MCG; when the value of the indicator is SCG, it indicates that the uplink transmission of MCG duplicated SRB1 adopts the SCG, that is, the PDCP entity transmits the data of SRB1 or a PDCP PDU via the SCG-RLC and/or SCG-MAC by using the radio resources of the SCG; when the value of the indicator is both or duplicate, it indicates that the uplink transmission of MCG duplicated SRB1 adopts the MCG and the SCG, that is, the PDCP entity transmits the same data of SRB1 or PDCP PDU via the MCG-RLC and the MCG-MAC and the SCG-RLC and the SCG-MAC by using the radio resources of the MCG and the SCG (in a packet duplication mode). In this embodiment, the value of the indicator may also be other values. Different values are respectively used to indicate that the uplink transmission of MCG duplicated SRB1 adopts one of three modes: MCG, SCG, and MCG and SCG.

In another embodiment, the RRC signaling for configuring MCG duplicated SRB1 carries an indicator. When the value of the indicator is 0 or True or Setup, etc., it indicates that the uplink transmission of MCG duplicated SRB1 adopts the MCG (or the SCG); when the value of the indicator is 1 or False or Release, etc., it indicates that the uplink transmission of MCG duplicated SRB1 adopts the SCG (or the MCG). When the indicator does not appear, it indicates that the uplink transmission of MCG duplicated SRB1 adopts the MCG and the SCG.

In another embodiment, the RRC signaling for configuring MCG duplicated SRB1 carries an indicator. When the value of the indicator is 0 or True or Setup, etc., it indicates that the uplink transmission of MCG duplicated SRB1 adopts the MCG and the SCG (or the SCG); when the value of the indicator is 1 or False or Release, etc., it indicates that the uplink transmission of MCG duplicated SRB1 adopts the SCG (or the MCG and the SCG). When the indicator does not appear, it indicates that the uplink transmission of MCG duplicated SRB1 adopts the MCG.

As shown in the figure, the method 300 comprises the following steps.

In step S310, an SCG failure is detected.

It should be noted that the SCG failure in the present disclosure may be that an SCG radio link fails, or changing an SCG fails, or a maximum uplink transmission timing difference is exceeded, resulting in termination of uplink transmission of a PSCell when an information element powerControlMode for indicating a power control mode used in a dual-connectivity scenario is set to 1.

The SCG radio link failure in the present disclosure may be triggered by the following events:

Event 1: A timer T313 for monitoring PSCell asynchronization expires.

Event 2: An SCG MAC random access problem (or error) indication is received.

Event 3: For an SCG DRB or a split DRB or an MCG duplicated SRB or an SCG SRB, an indication that a maximum number of retransmissions has been reached is received.

Conditions for the start/stop of timers T307 and T313 and operations performed when the timers expire are shown in Table 1:

TABLE 1

| Timer | Start | Stop | Expire |
|---|---|---|---|
| T307 | An RRC reconfiguration message RRCConnectionReconfiguration containing an information element MobilityControlInfoSCG instructing to change an SCG is received. | Random access on a PSCell succeeds or re-establishment is initiated or an SCG is released. | An SCG failure information procedure is initiated for notification of an E-UTRAN or 5G-RAN SCG change failure. |
| T313 | A physical layer problem is detected on a PSCell, that is, a continuous out-of-sync indication from a lower layer is received N313 times. | For a PSCell, a continuous in-sync indication from a lower layer is received N314 times or a connection re-establishment procedure is initiated or an SCG is released or RRCConnectionReconfiguration containing MobilityControlInfoSCG is received. | An SCG failure information procedure is initiated for notification of an E-UTRAN or 5G-RAN SCG radio link failure |

In step S320, the MCG duplicated SRB is reconfigured to be used for uplink transmission via the MCG, or an MCG failure is triggered.

In one example, the UE is further configured with another MCG duplicated SRB (e.g., SRB2), and the method 300 further comprises, after the SCG failure is detected: reconfiguring the other MCG duplicated SRB to be used for uplink transmission via the MCG.

In one example, the reconfiguration may be performed by releasing an uplink transmission configuration of the MCG duplicated SRB or the other MCG duplicated SRB.

In one example, the method 300 further comprises: reporting the SCG failure to a base station. The reporting the SCG failure to a base station comprises: transmitting the SCG failure information to the base station via the MCG by using the reconfigured MCG duplicated SRB, or transmitting the SCG failure information to the base station through a Common Control Channel (CCCH) by using the MCG SRB.

In one example, the method 300 further comprises: receiving from the base station instruction information instructing the UE whether to perform uplink transmission via the MCG when the SCG fails. The reconfiguration is performed only when the instruction information instructs to perform uplink transmission via the MCG when the SCG fails.

Specifically, for the foregoing embodiment for configuring MCG duplicated SRB1, the RRC signaling further comprises an indicator, wherein the indicator is used to indicate whether uplink transmission can be performed by using the MCG when the SCG fails, or if the uplink transmission of MCG duplicated SRB1 is configured to adopt the SCG (or the MCG and the SCG), then whether uplink transmission can be performed by using the MCG when the SCG fails. For example, when the value of the indicator is "1" or "True" or "Setup" or the indicator appears, it indicates that if the uplink transmission of the MCG duplicated SRB is configured to adopt the SCG or the MCG and the SCG, then when the SCG fails, the uplink transmission of the MCG duplicated SRB adopts the MCG. When the value of the indicator is "0" or "False" or "Release" or the indicator does not appear, it indicates that if the uplink transmission of the MCG duplicated SRB is configured to adopt the SCG or the MCG and the SCG, then when the SCG fails, an uplink (UL) Common Control Channel (CCCH) is used to transmit the SCG failure information or an uplink transmission configuration of the MCG duplicated SRB is released. When the indicator indicates that the uplink transmission of the MCG duplicated SRB adopts the MCG when the SCG fails, then when the uplink transmission of the MCG duplicated SRB is configured to adopt the SCG or the MCG and the SCG, if an SCG failure occurs, the uplink transmission of the MCG duplicated SRB adopts the MCG.

It should be noted that the reconfiguring the MCG duplicated SRB (or split SRB) to be used for uplink transmission via the MCG may also be expressed as reconfiguring a PDCP entity of the MCG duplicated SRB (or split SRB), such that a PDCP PDU is transmitted via the MCG or MCG-RLC, or reconfiguring the PDCP entity of the MCG duplicated SRB (or split SRB) such that the PDCP entity transmits a PDCP PDU to the MCG-RLC.

The method 300 is described below with reference to specific examples. Herein, without loss of generality, it is assumed that the above MCG duplicated SRB is SRB1, and the other MCG duplicated SRB is SRB2.

When the UE detects an SCG failure, an SCG failure information procedure is initiated to report the SCG failure. The user equipment performs the SCG failure information procedure differently depending on different uplink transmission configurations of MCG duplicated SRB1. Specifically, the following steps are as follows:

1. If uplink transmission of MCG duplicated SRB1 is configured to adopt the MCG, then the SCG failure information procedure comprises at least one of the following operations: A. suspending all SCG DRBs and suspending SCG transmission of split DRBs and split SRBs (or SCG downlink transmission of the split SRBs); B. resetting the SCG-MAC; C. stopping the timer T307 used for monitoring SCG change failures; and D. initiating a transmission procedure of an SCGFailureInformation message. The SCGFailureInformation message is used to provide error information detected by the UE, and is transmitted by using the MCG.

2. If the uplink transmission of MCG duplicated SRB1 is configured to adopt the MCG and the SCG, then the SCG failure information procedure comprises at least one of the following operations: A. suspending all SCG DRBs and suspending SCG transmission of split DRBs and split SRBs (or SCG uplink and/or downlink transmission of the split SRBs); B. resetting the SCG-MAC; C. stopping the timer T307 used for monitoring SCG change failures; and D. initiating a transmission procedure of an SCGFailureInformation message. The SCGFailureInformation message is transmitted by using the MCG.

3. If the uplink transmission of MCG duplicated SRB1 is configured to adopt the SCG, the SCG failure information procedure is described in the following exemplary implementations.

Exemplary Implementation 1

The SCG failure information procedure comprises at least one of the following operations: A. suspending all SCG DRBs and suspending SCG transmission of split DRBs and/or SCG transmission of split SRBs (or SCG downlink transmission of the split SRBs or SCG transmission of MCG duplicated SRBs); B. resetting the SCG-MAC; C. stopping the timer T307 used for monitoring SCG change failures; and D. initiating a transmission procedure of an SCGFailureInformation message, wherein the procedure comprises: reconfiguring MCG duplicated SRB1 to be used for uplink transmission via the MCG, and transmitting the SCGFailureInformation message to a lower layer for transmission; or, instructing or reconfiguring a PDCP entity of MCG duplicated SRB1 to transmit the SCGFailureInformation message via the MCG (that is, using resources provided by the MCG for transmission); or, reconfiguring the PDCP entity of MCG duplicated SRB1 to release the restriction of transmitting data (or uplink data) of split SRB1 via the SCG; or, releasing an uplink transmission configuration of MCG duplicated SRB1.

Exemplary Implementation 2

The SCG failure information procedure comprises at least one of the following operations: A. suspending all SCG DRBs and suspending SCG transmission of split DRBs and/or SCG transmission of MCG duplicated SRB1 (or SCG downlink transmission of MCG duplicated SRB1); B. resetting the SCG-MAC; C. stopping the timer T307 used for monitoring SCG change failures; D. initiating a transmission procedure of an SCGFailureInformation message, wherein the procedure comprises: reconfiguring MCG duplicated SRB1 to be used for uplink transmission via the MCG, and transmitting the SCGFailureInformation message to a lower layer for transmission; or, instructing or reconfiguring the PDCP entity of MCG duplicated SRB1 to transmit the SCGFailureInformation message via the MCG; or, reconfiguring the PDCP entity of MCG duplicated SRB1 to release the restriction of transmitting the data (or uplink data) of split SRB1 via the SCG; or, releasing the uplink transmission configuration of MCG duplicated SRB1; and E. if uplink transmission of MCG duplicated SRB2 is configured to adopt the SCG, reconfiguring MCG duplicated SRB2 to be used for uplink transmission via the MCG, or instructing or reconfiguring a PDCP entity to release the restriction of performing the uplink transmission of MCG duplicated SRB2 via the SCG, or suspending SCG transmission of MCG duplicated SRB2, or releasing an uplink transmission configuration of MCG duplicated SRB2.

Exemplary Implementation 3

The SCG failure information procedure comprises at least one of the following operations: A. suspending all SCG DRBs and suspending SCG transmission of split DRBs and/or SCG transmission of split SRBs (or SCG downlink transmission of the split SRBs); B. reconfiguring all MCG duplicated SRBs to be used for uplink transmission via the MCG, or reconfiguring PDCP entities of all the MCG duplicated SRBs to release the restriction of transmitting data (or uplink data) of the split SRBs via the SCG, or releasing uplink transmission configurations of the MCG duplicated SRBs: C. resetting the SCG-MAC; D. stopping the timer T307 used for monitoring SCG change failures; and E. initiating a transmission procedure of an SCGFailureInformation message, wherein the SCGFailureInformation message is transmitted by using the MCG.

Exemplary Implementation 4

The UE detects an SCG failure. If the uplink transmission of MCG duplicated SRB1 is configured to adopt the SCG, it is considered that a failure of a radio link of the MCG is detected, and a related procedure that should be performed when a radio link failure occurs during initiating of the MCG.

Optionally, for the foregoing embodiment for configuring MCG duplicated SRB1, the RRC signaling further comprises an indicator for indicating whether an MCG radio link failure is to be triggered when the SCG fails. When the indicator indicates that an MCG radio link failure is to be triggered when the SCG fails, if the uplink transmission of MCG duplicated SRB1 is configured to adopt the SCG, it is considered that a failure of the radio link of the MCG is detected, and a related procedure that should be performed when a radio link failure occurrence is initiated. For example, when the value of the indicator is "1" or "True" or "Setup" or the indicator appears, an MCG radio link failure is triggered when the SCG fails; when the value of the indicator is "0" or "False" or "Release" or the indicator does not appear, an MCG radio link failure is not triggered when the SCG fails; and vice versa.

Optionally, for the foregoing embodiment for configuring MCG duplicated SRB1, if the uplink transmission of MCG duplicated SRB1 is configured to adopt the SCG or the MCG and the SCG, the RRC signaling further comprises an indicator for indicating whether an MCG radio link failure is to be triggered when the SCG fails. When the indicator indicates that an MCG radio link failure is to be triggered when the SCG fails, if the uplink transmission of MCG duplicated SRB1 is configured to adopt the SCG or the MCG and the SCG, it is considered that a failure of the radio link of the MCG is detected, and a related procedure that should be performed when a radio link failure occurrence is initiated.

Exemplary Implementation 5

The SCG failure information procedure comprises at least one of the following operations: A. suspending all SCG DRBs and suspending SCG transmission of split DRBs and/or SCG transmission of split SRBs (or SCG downlink transmission of the split SRBs); B. resetting the SCG-MAC; C. stopping the timer T307 used for monitoring SCG change failures; and D. initiating a transmission procedure of an SCGFailureInformation message, and using an UL-CCCH to transmit the SCGFailureInformation message or using the UL-CCCH (i.e., SRB0) for uplink transmission.

Optionally, for the foregoing embodiment for configuring MCG duplicated SRB1, the RRC signaling further comprises an indicator for indicating whether to use the UL-CCCH to transmit the SCGFailureInformation message or to perform uplink transmission when the SCG fails. Only when the value of the indicator corresponds to using the UL-CCCH to transmit the SCGFailureInformation message when the SCG fails can the UL-CCCH be used to transmit the SCGFailureInformation message when the SCG fails. For example, when the value of the indicator is "1" or "True" or "Setup" or the indicator appears, the UL-CCCH is used to transmit the SCGFailureInformation message when the SCG fails. When the value of the indicator is "0" or "False" or "Release" or the indicator does not appear, the UL-CCCH is not used to transmit the SCGFailureInformation message when the SCG fails; or an MCG radio link failure is triggered; and vice versa.

Optionally, for the foregoing embodiment for configuring MCG duplicated SRB1, if the uplink transmission of MCG duplicated SRB1 is configured to adopt the SCG or the MCG and the SCG, the RRC signaling further comprises an indicator for indicating whether to use the UL-CCCH to transmit the SCGFailureInformation message when the SCG fails. Only when the value of the indicator corresponds to using the UL-CCCH to transmit the SCGFailureInformation message when the SCG fails can the UL-CCCH be used to transmit the SCGFailureInformation message when the SCG fails. For example, when the value of the indicator is "1" or "True" or "Setup" or the indicator appears, the UL-CCCH is used to transmit the SCGFailureInformation message when the SCG fails. When the value of the indicator is "0" or "False" or "Release" or the indicator does not appear, the UL-CCCH is not used to transmit the SCGFailureInformation message when the SCG fails; or an MCG radio link failure is triggered; and vice versa.

Exemplary Implementation 6

The SCG failure information procedure comprises at least one of the following operations: A. suspending all SCG DRBs and suspending SCG transmission of split DRBs and/or SCG transmission of split SRBs (or SCG downlink transmission of the split SRBs); B. resetting the SCG-MAC; C. stopping the timer T307 used for monitoring SCG change failures; and D. initiating a transmission procedure of an SCGFailureReport message, wherein the message is used to indicate an SCG failure, or to request the base station to reconfigure MCG duplicated SRBs, or to provide error information detected by the UE, and using an UL-CCCH to transmit the SCGFailureReport message or using the UL-CCCH (i.e., SRB0) for uplink transmission. Optionally, if an SCGFailureInformation message or the content of the message is not transmitted in the SCGFailureReport message, after receiving a message from the base station for reconfiguring uplink transmission of the MCG duplicated SRBs, the UE initiates a transmission procedure of the SCGFailureInformation message and uses the reconfigured uplink transmission of the MCG duplicated SRBs to transmit the SCGFailureInformation message.

Optionally, for the foregoing embodiment for configuring MCG duplicated SRB1, the RRC signaling further comprises an indicator for indicating whether to use the UL-CCCH to transmit the SCGFailureReport message or to perform uplink transmission when the SCG fails. Only when the value of the indicator corresponds to using the UL-CCCH to transmit the SCGFailureReport message when the SCG fails can the UL-CCCH be used to transmit the SCGFailureReport message when the SCG fails; otherwise, the UL-CCCH is not used to transmit the SCGFailureReport message when the SCG fails, or an MCG radio link failure is triggered. For example, when the value of the indicator is "1" or "True" or "Setup" or the indicator appears, the UL-CCCH is used to transmit the SCGFailureReport message when the SCG fails. When the value of the indicator is "0" or "False" or "Release" or the indicator does not appear, the UL-CCCH is not used to transmit the SCGFailureReport message when the SCG fails; or an MCG radio link failure is triggered; and vice versa.

Optionally, for the foregoing embodiment for configuring MCG duplicated SRB1, if the uplink transmission of MCG duplicated SRB1 is configured to adopt the SCG or the MCG and the SCG, the RRC signaling further comprises an indicator for indicating whether to use the UL-CCCH to transmit the SCGFailureReport message when the SCG fails. Only when the value of the indicator corresponds to using the UL-CCCH to transmit the SCGFailureReport message when the SCG fails can the UL-CCCH be used to transmit the SCGFailureReport message when the SCG fails; otherwise, the UL-CCCH is not used to transmit the SCGFailureReport message when the SCG fails, or an MCG radio link failure is triggered. For example, when the value of the indicator is "1" or "True" or "Setup" or the indicator appears, the UL-CCCH is used to transmit the SCGFailureReport message when the SCG fails. When the value of the indicator is "0" or "False" or "Release" or the indicator does not appear, the UL-CCCH is not used to transmit the SCGFailureReport message when the SCG fails; or an MCG radio link failure is triggered; and vice versa.

It should be noted that the embodiments for configuring MCG duplicated SRB1 described in the present disclosure are also applicable to configuring MCG duplicated SRB2 by simply replacing SRB1 in each example with SRB2.

It should be noted that, if MCG duplicated SRB2 is configured to adopt the SCG in uplink, when the SCG fails, then the operations in the above SCG failure information procedure embodiments may further comprise reconfiguring MCG duplicated SRB2 to be used for uplink transmission via the MCG.

Figure 4:
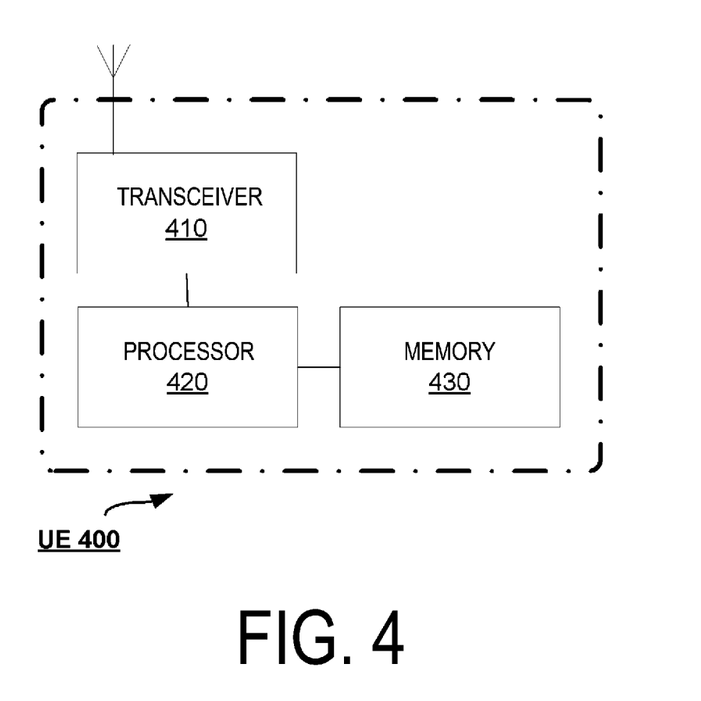
FIG. 4 is a block diagram of user equipment according to an embodiment of the present disclosure.

Corresponding to the method 300 described above, the present disclosure provides User Equipment (UE). FIG. 4 is a block diagram of UE 400 according to an embodiment of the present disclosure. The UE 400 is configured with a Master Cell Group (MCG) duplicated Signaling Radio Bearer (SRB), and the MCG duplicated SRB is associated with an MCG and a Secondary Cell Group (SCG) and configured to be used for uplink transmission via the SCG. As shown in the figure, the UE 400 comprises a transceiver 410, a processor 420, and a memory 430. The processor 430 stores instructions executable by the processor 420 to cause the base station 400 to perform the method 300 described above with reference to FIG. 3.

Specifically, the processor 430 stores instructions executable by the processor 420 to cause the UE 400 to perform the following: detect an SCG failure and reconfigure the MCG duplicated SRB to be used for uplink transmission via the MCG, or trigger an MCG failure.

In one example, the UE is further configured with another MCG duplicated SRB. The processor 430 further stores instructions executable by the processor 420 to cause the UE 400 to, after the SCG failure is detected, reconfigure the other MCG duplicated SRB to be used for uplink transmission via the MCG.

In one example, the processor 430 further stores instructions executable by the processor 420 to cause the UE 400 to report the SCG failure to a base station, wherein the reporting the SCG failure to a base station comprises: transmitting the SCG failure information to the base station via the MCG by using the reconfigured MCG duplicated SRB, or transmitting the SCG failure information to the base station through a Common Control Channel (CCCH) by using the MCG SRB.

In one example, the processor 430 further stores instructions executable by the processor 420 to cause the UE 400 to receive from the base station instruction information instructing the UE whether to perform uplink transmission via the MCG when the SCG fails, wherein the reconfiguration is performed only when the instruction information instructs to perform uplink transmission via the MCG when the SCG fails.

Figure 5:
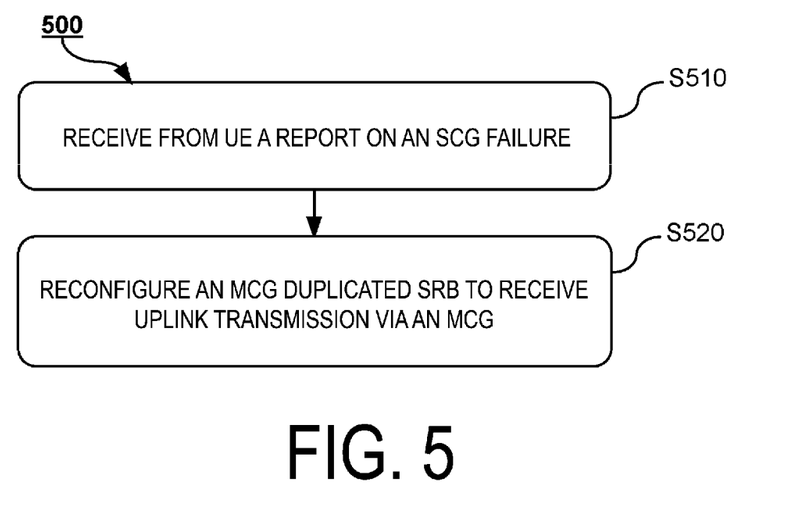
FIG. 5 is a flowchart of a method used in a base station according to an embodiment of the present disclosure.

The present disclosure further provides a method used in a base station. FIG. 5 is a flowchart of a method 500 used in a base station according to an embodiment of the present disclosure. The base station is a Master Cell Group (MCG) base station and communicates with User Equipment (UE) over an MCG duplicated Signaling Radio Bearer (SRB); the MCG duplicated SRB is associated with the MCG and a Secondary Cell Group (SCG) and configured to be used for uplink transmission via the SCG. As shown in the figure, the method 500 comprises the following steps:

In step S510, a report on an SCG failure is received from the UE.

In step S520, the MCG duplicated SRB is reconfigured to receive uplink transmission via the MCG.

In one example, the receiving a report on an SCG failure comprises: receiving the SCG failure information via the MCG by using the reconfigured MCG duplicated SRB, or receiving the SCG failure information through a Common Control Channel (CCCH) by using the MCG SRB.

In one example, the base station further communicates with the UE over another MCG duplicated SRB, the method 500 further comprising: reconfiguring the other MCG duplicated SRB to receive uplink transmission via the MCG.

In an example, the method 500 further comprises: transmitting to the UE instruction information instructing the UE whether to perform uplink transmission via the MCG when the SCG fails.

The various examples described above regarding the method 300, Exemplary Implementations 1-6 in particular, are also applicable to the method 500.

Figure 6:
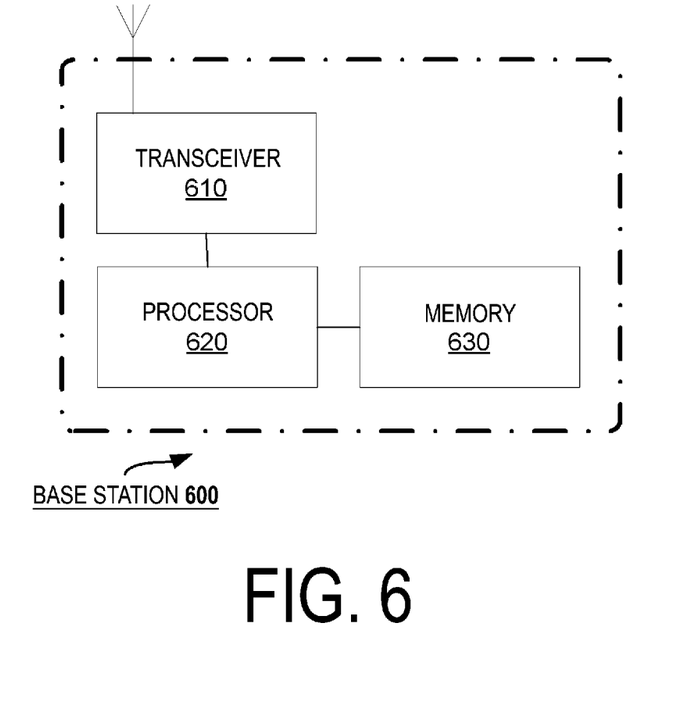
FIG. 6 is a block diagram of a base station according to an embodiment of the present disclosure.

In accordance with the method 500 described above, the present disclosure provides a base station. FIG. 6 is a block diagram of a base station 600 according to an embodiment of the present disclosure. The base station is a Master Cell Group (MCG) base station and communicates with User Equipment (UE) over an MCG duplicated Signaling Radio Bearer (SRB); the MCG duplicated SRB is associated with the MCG and a Secondary Cell Group (SCG) and configured to be used for uplink transmission via the SCG. As shown in the figure, the base station 600 comprises a transceiver 610, a processor 620, and a memory 630. The processor 630 stores instructions executable by the processor 620 to cause the base station 600 to perform the method 500 described above with reference to FIG. 5.

Specifically, the processor 630 stores instructions executable by the processor 620 to cause the base station 600 to receive from the UE a report on an SCG failure and reconfigure the MCG duplicated SRB to receive uplink transmission via the MCG.

In one example, the receiving a report on an SCG failure comprises: receiving the SCG failure information via the MCG by using the reconfigured MCG duplicated SRB, or receiving the SCG failure information through a Common Control Channel (CCCH) by using the MCG SRB.

In one example, the base station also communicates with the UE over another MCG duplicated SRB, and the processor 630 further stores instructions executable by the processor 620 to cause the base station 600 to reconfigure the other MCG duplicated SRB to receive uplink transmission via the MCG.

In one example, the processor 630 stores instructions executable by the processor 620 to cause the base station 600 to transmit to the UE instruction information instructing the UE whether to perform uplink transmission via the MCG when the SCG fails.

The computer-executable instructions or program running on the device according to the present invention may be a program that enables the computer to implement the functions of the embodiments of the present invention by controlling the central processing unit (CPU). The program or information processed by the program can be stored temporarily in a volatile memory (for example, a random access memory (RAM)), a hard disk drive (HDD), a non-volatile memory (for example, a flash memory), or other memory systems.

The computer-executable instructions or program for implementing the functions of the embodiments of the present invention may be recorded on a computer-readable storage medium. The corresponding functions can be achieved by reading programs recorded on the recording medium and executing them by the computer system. The so-called "computer system" herein may be a computer system embedded in the device, which may include operating systems or hardware (for example, peripherals). The "computer-readable storage medium" may be a semiconductor recording medium, an optical recording medium, a magnetic recording medium, a short-time dynamic memory program recording medium, or any other recording medium readable by a computer.

Various features or functional modules of the device used in the above embodiments may be implemented or executed through circuits (for example, monolithic or multi-chip integrated circuits). Circuits designed to execute the functions described in this description may include general-purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies replacing existing integrated circuits emerge from advances in semiconductor technology, one or a plurality of embodiments of the present invention may also be implemented using these new integrated circuit technologies.

Furthermore, the present invention is not limited to the embodiments described above. Although various examples of the embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments. The present invention also includes any design modifications that do not depart from the main idea of the present invention. In addition, various modifications can be made to the present invention within the scope of the claims. Embodiments resulted from the appropriate combinations of the technical means disclosed in different embodiments are also included within the technical scope of the present invention. In addition, components with the same effect described in the above embodiments may be replaced with one another.

The invention claimed is:

1. A method for User Equipment (UE), wherein the UE is configured with a first Master Cell Group (MCG) duplicated Signaling Radio Bearer (SRB) and a second MCG duplicated SRB, and the first MCG duplicated SRB is associated with an MCG and a Secondary Cell Group (SCG) and configured to be used for uplink transmission via the SCG, the method comprising:

detecting an SCG failure;

reconfiguring the first MCG duplicated SRB to be used for uplink transmission via the MCG, or triggering an MCG failure; and reconfiguring the second MCG duplicated SRB to be used for uplink transmission via the MCG.

2. The method according to claim 1, further comprising:

reporting the SCG failure to a base station by:

transmitting information about the SCG failure to the base station via the MCG by using the reconfigured first MCG duplicated SRB; or transmitting the information about the SCG failure to the base station through a Common Control Channel (CCCH) by using an MCG SRB.

3. The method according to claim 1, further comprising:

receiving, from a base station, information instructing the UE whether to perform uplink transmission via the MCG when the SCG failure is detected, wherein in response to the information instructing the UE to perform uplink transmission via the MCG when the SCG failure is detected, the first MCG duplicated SRB is reconfigured to be used for uplink transmission via the MCG.

4. User Equipment (UE), wherein the UE is configured with a first Master Cell Group (MCG) duplicated Signaling Radio Bearer (SRB) and a second MCG duplicated SRB, and the first MCG duplicated SRB is associated with an MCG and a Secondary Cell Group (SCG) and configured to be used for uplink transmission via the SCG, the UE comprising:

a memory storing instructions; and a processor configured to execute the instructions to cause the UE to:

detect an SCG failure;

reconfigure the first MCG duplicated SRB to be used for uplink transmission via the MCG, or trigger an MCG failure; and reconfigure the second MCG duplicated SRB to be used for uplink transmission via the MCG.

5. A method for a base station, wherein the base station includes a Master Cell Group (MCG) base station and communicates with User Equipment (UE) over a first MCG duplicated Signaling Radio Bearer (SRB) and a second MCG duplicated SRB, and the first MCG duplicated SRB is associated with the MCG and a Secondary Cell Group (SCG) and configured to be used for uplink transmission via the SCG, the method comprising:

receiving, from the UE, a report of an SCG failure;

reconfiguring the first MCG duplicated SRB to receive uplink transmission via the MCG; and reconfiguring the second MCG duplicated SRB to receive uplink transmission via the MCG.

6. The method according to claim 5, wherein receiving the report of the SCG failure comprises:

receiving information about the SCG failure via the MCG by using the reconfigured first MCG duplicated SRB; or receiving the information about the SCG failure through a Common Control Channel (CCCH) by using an MCG SRB.

7. The method according to claim 5, further comprising:

transmitting, to the UE, information instructing the UE whether to perform uplink transmission via the MCG when the SCG failure is detected.

8. A base station, wherein the base station includes a Master Cell Group (MCG) base station and communicates with User Equipment (UE) over a first MCG duplicated Signaling Radio Bearer (SRB) and a second MCG duplicated SRB, and the first MCG duplicated SRB is associated with the MCG and a Secondary Cell Group (SCG) and configured to be used for uplink transmission via the SCG, the base station comprising:

a memory storing instructions; and a processor configured to execute the instructions to cause the base station to:

receive, from the UE, a report of an SCG failure;

reconfigure the first MCG duplicated SRB to receive uplink transmission via the MCG; and reconfigure the second MCG duplicated SRB to receive uplink transmission via the MCG.

* * * * *